(12) United States Patent
Bernt et al.

(10) Patent No.: US 8,444,215 B2
(45) Date of Patent: May 21, 2013

(54) HOUSING FOR THE RADIATOR BLIND OF A MOTOR VEHICLE

(75) Inventors: Volker Bernt, Trebur (DE); Rolf Ewert, Ruesselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/240,183

(22) Filed: Sep. 22, 2011

(65) Prior Publication Data

US 2012/0074730 A1 Mar. 29, 2012

(30) Foreign Application Priority Data

Sep. 24, 2010 (DE) .................... 20 2010 013 597 U

(51) Int. Cl.
*B60R 19/52* (2006.01)

(52) U.S. Cl.
USPC ...................................................... 296/193.1

(58) Field of Classification Search
USPC ..................... 296/193.1; 180/68.1
See application file for complete search history.

(56) References Cited

U.S. PATENT DOCUMENTS

| | | | | | |
|---|---|---|---|---|---|
| 1,910,905 | A | * | 5/1933 | Petersen | 165/98 |
| 1,950,218 | A | * | 3/1934 | Bierbach | 49/96 |
| 1,977,538 | A | * | 10/1934 | Anderson | 236/35.2 |
| 2,901,961 | A | * | 9/1959 | Cotts | 49/77.1 |
| 3,759,056 | A | * | 9/1973 | Graber | 62/183 |
| 4,619,073 | A | | 10/1986 | Janthur et al. | |
| 4,753,288 | A | * | 6/1988 | Harvey | 165/98 |
| 6,422,643 | B1 | * | 7/2002 | Pease | 296/193.1 |
| 6,626,483 | B2 | * | 9/2003 | Ozawa et al. | 296/193.09 |
| 6,886,872 | B2 | | 5/2005 | Matsumoto et al. | |
| 7,152,915 | B2 | * | 12/2006 | Diehl et al. | 296/193.1 |
| 7,464,984 | B1 | * | 12/2008 | McDaniel | 296/193.1 |
| 2005/0006928 | A1 | * | 1/2005 | Diehl et al. | 296/193.1 |
| 2010/0139583 | A1 | | 6/2010 | Klotz et al. | |
| 2012/0019025 | A1 | * | 1/2012 | Evans et al. | 296/193.1 |

FOREIGN PATENT DOCUMENTS

| | | | |
|---|---|---|---|
| DE | 3605064 A1 | * | 8/1987 |
| DE | 10306158 A1 | | 8/2004 |
| DE | 60307584 T2 | | 8/2007 |
| DE | 102007030890 A1 | | 1/2009 |
| DE | 102007053531 A1 | | 5/2009 |
| DE | 102008061054 A1 | | 6/2010 |
| DE | 202010013597 U1 | | 11/2010 |
| FR | 2821817 A3 | | 9/2002 |
| JP | 2010149691 A | | 7/2010 |

OTHER PUBLICATIONS

German Patent Office, German Search Report for Application No. 20210013597.4, dated Jul. 6, 2011.
British Patent Office, British Search Report for Application No. 1115985.2, dated Jan. 10, 2012.

* cited by examiner

*Primary Examiner* — H Gutman
(74) *Attorney, Agent, or Firm* — Ingrassia Fisher & Lorenz, P.C.

(57) ABSTRACT

A housing is provided for a radiator blind of a motor vehicle. The housing includes a base section that is configured to accommodate the radiator blind and a prescribed port. The housing also includes an adapter section that is secured to the prescribed port. As a result of this measure, the housing can be used in various installation situations.

19 Claims, 2 Drawing Sheets ved housing parts is not needed. Likewise conceivable would be a variant in which, apart from the adapter section and base section, other elements are provided that make up the housing. However, it should be noted that an especially

HOUSING FOR THE RADIATOR BLIND OF A MOTOR VEHICLE

CROSS-REFERENCE TO RELATED APPLICATION

This application claims priority to German Patent Application No. 202010013597.4, filed Sep. 24, 2010, which is incorporated herein by reference in its entirety.

TECHNICAL FIELD

The technical field relates to a housing for the radiator blind of a motor vehicle.

The invention further relates to a radiator blind and a motor vehicle.

BACKGROUND

Motor vehicles usually use the relative wind for cooling the engine. To this end, conventionally controllable cooling air blinds are used, with which the cooling air flowing through the engine compartment can be controlled as a function of the respective operating state of the motor vehicle. The cooling air blind is here usually situated between the coolant radiator and engine cooling fan of the motor vehicle.

Motor vehicles today exhibit a wide variety of installation spaces for accommodating the radiator blind. The varied installation spaces require that the housing that accommodates the radiator blind be individually adjusted. The steadily expanding range of different vehicle types has in the meantime prompted manufacturers to keep a plurality of different radiator blind units on hand. This is complicated and expensive.

Therefore, at least one object of the invention is to provide a housing for the radiator blind of a motor vehicle having the features mentioned at the outset, which is suitable for installation given various mounting circumstances. Further to be proposed is a corresponding radiator blind unit along with a motor vehicle with such a radiator blind unit.

SUMMARY

The at least one object is achieved with a housing for the radiator blind of a motor vehicle, with an adapter as a replacement part for a housing of a vehicle radiator blind, and with a radiator blind unit with the features as well as a motor vehicle.

A housing is provided for the radiator blind of a motor vehicle exhibits a base section for accommodating a radiator blind. The base section is preferably designed for holding a controllable radiator blind. For example, the radiator blind can be adjusted by means of expanding material elements, vacuum dashpots, stepping motors or similar actuators in such a way that more or less relative wind passes through the passage encompassed by the radiator blind and into the engine compartment as a stream of cooling air, flowing in particular toward the coolant radiator of the motor vehicle.

To be understood as a radiator blind in the sense of the invention is a grid preferably comprised of lamellae that can turn around their longitudinal axis. Turning all lamellae simultaneously or turning individual lamellae of the radiator blind here allows more or less relative wind through the passage covered by the radiator blind. Of course, the radiator blind can also consist of other arrangements that can be used to close, open or open/close to more or less of an extent a passage to allow relative wind through, making it possible to adjust the relative wind as a stream of cooling air flowing through the passage.

The housing exhibits an adaptor section designed for attachment to a prescribed port. As a result of this measure, the housing can be used in various installation situations. All that needs to be provided for this purpose is a correspondingly adjusted adapter section of the housing, which is designed for attachment to the prescribed port. In order to install the housing in or on different motor vehicles, one must only select a matching adapter section for the respectively existing mounting situation. The base section for accommodating the radiator blind can remain unchanged.

Because the housing has multiple parts, in particular two parts, the manufacturing costs are lower, since only one of the housing parts, specifically the adapter section, must be adjusted to the existing installation situation on the motor vehicle. The adapter section should preferably be detachably connected with the base section. This makes it possible to detach the adapter section from the base section.

It makes sense for the adapter section to be replaceable. Making the adapter section replaceable in this way makes it possible to easily adjust the housing to varying installation spaces in different vehicles, because one adapter section can be replaced with another adapter section. As a result, it is especially easy to change the housing from an installation situation existing in one vehicle to another installation situation in another motor vehicle. It further makes sense for the base section to be a standardized component. This makes the base section especially cost effective to manufacture, since the base section can be kept constant over the standardization process. Because the base section is a standard part, the same type of radiator blind accommodated in the constant base section can be used for all installation spaces in the various motor vehicles.

One embodiment provides that the adapter section and base section are at least partially pressed against or into each other. This makes it possible to easily realize a positive connection between the adapter section and base section. Another embodiment provides that the adapters section be designed like a kind of frame, which at least partially incorporates the base section. This yields an especially strong bond between the adapter section and base section, wherein the adapter section acts as an outer limit for the base section. Another embodiment of the invention provides that the adapter section and base section are joined together by means of at least one screwed, clipped, latched and/or clamped connection.

Another embodiment provides that at least one clipping element is arranged, in particular molded, on the adapter section, and holds the base section in an aligned position relative to the adapter section when clipped in. This makes it especially easy to mount the adapter section to the base section.

Another embodiment provides that the adapter section exhibits at least one terminal section, to which the adapter section can be coupled to the prescribed port. As a result, the adapter section can be secured to the mounting situation in an especially effective way, since the terminal section allows a connection with the correspondingly prescribed port. Another embodiment provides that the adapter section exhibits at least one mounting device for cables and/or a cable harness, at least one mounting device for at least one sensor and/or at least one mounting device for other parts. As a result, the adapter section performs multiple functions. On the one hand, the adapter section serves as an intermediate element between the base section with the radiator blind that can be incorporated therein and the port of the motor vehicle. On the other hand, the adapter section performs a retaining function.

In the housing, it makes sense that the adapter section and base section be pre-mountable relative to each other, in particular forming a pre-assembled unit. This enables a final assembly of the housing complete with radiator blind in an especially easy manner, since the pre-assembled unit can already be used for this purpose. This avoids a time-consuming assembly of the housing at the final installation site. The housing is particularly easy and cost-effective to fabricate if the adapter section is a plastic part, in particular an injection-molded plastic part. It here makes sense for the base section to also be a plastic part, in particular an injection-molded plastic part.

Another embodiment provides an adapter as a replacement part for the housing of a vehicle radiator blind having the features of the adapter section of the kind described above. Embodiments also encompass a radiator blind unit with a housing of the kind described above. Embodiments further encompass a motor vehicle with a radiator blind unit of the kind described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
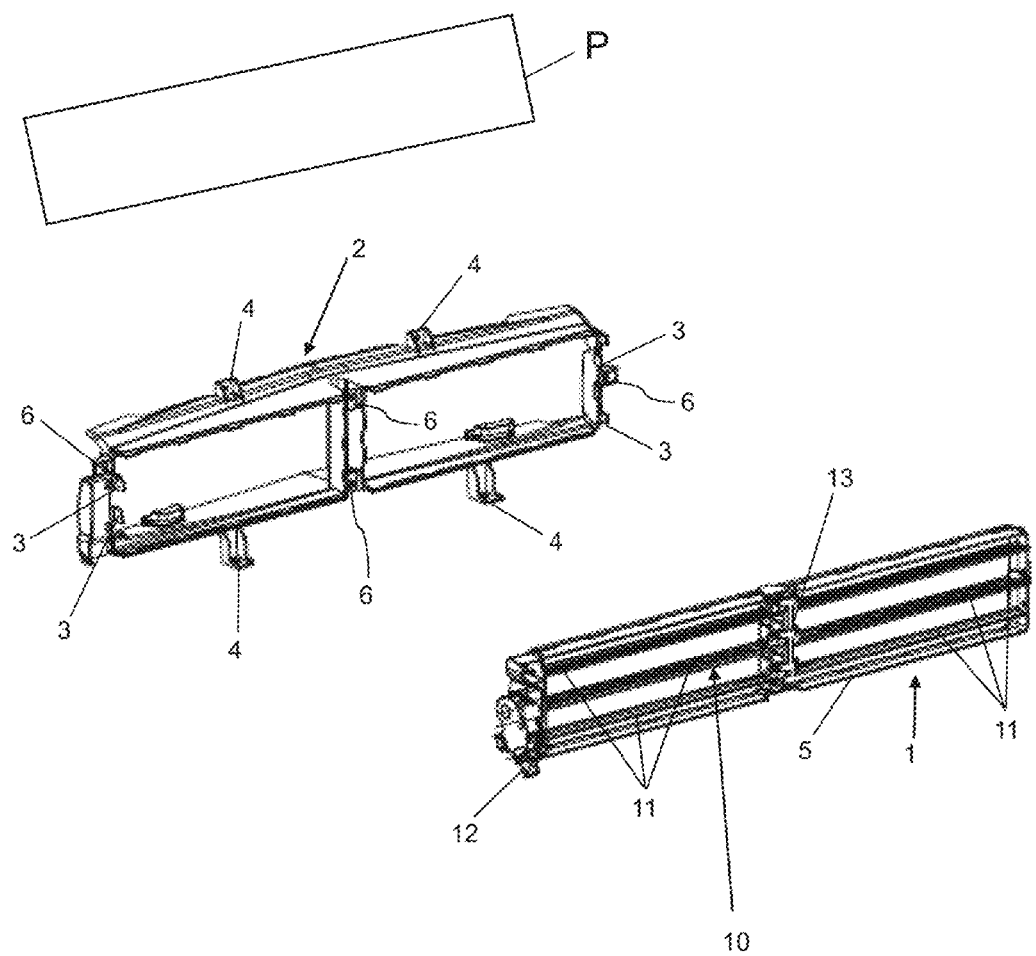
FIG. 1 is a potential embodiment of a housing for the radiator blind of a motor vehicle, exploded view.

FIG. 1 presents a diagrammatic representation of an embodiment of the housing for the radiator blind 10 of a motor vehicle (not shown) in an exploded view. The housing is divided into two parts, consisting of a base section 1 and an adapter section 2. The base section 1 exhibits a frame 5, on which are pivoted several lamellar elements 11 of the radiator blind 10. The lamellar elements 11 are jointly rotatable by means of a drive 12 and rod system 13. To this end, the drive 12 is preferably arranged in such a way that the drive 12 directly drives one of the lamellar elements 11, and the movement is transmitted via the rod system 13 from the one lamellar element 11 to the other remaining lamellar elements 11. Turning the lamellar elements 11 makes it possible to open the through hole formed by the frame 5 to more or less of an extent, so that the relative wind flowing into the engine compartment as a stream of cooling air can be varied or controlled by turning the lamellar elements 11 with the radiator blind 10 installed. The base section 1 with the radiator blind 10 incorporated therein can be mounted to a prescribed port P by means of the adapter section 2. The port P can be arranged on or in a vehicle, in particular on a heat exchanger (not shown) of the liquid cooling system for the combustion engine of the motor vehicle.

The adapter section 2 is preferably a plastic part, in particular an injection molded part, which exhibits at least one terminal section 4 so that it can be fixed to the prescribed port P. The adapter section 2 is preferably designed as a kind of frame so as to accommodate the base section 1 therein, wherein the adapter section 2 and base section 1 can be pressed into or against each other. The adapter section 2 exhibits at least one, advantageously two outside clip elements 3, with which the base section is held in an aligned position relative to the adapter section 2 when clipped in, in particular detachably secured. The adapter section 2 further exhibits several threaded boreholes 6, into which the base section 1 is tightened via its frame 5 to the adapter section 2 by means of screws (not shown). Tightening here preferably only takes place after the adapter section 2 has been clipped with the base section 1.

Because the housing for the radiator blind 10 have multiple parts, the base section 1 incorporating the radiator blind 10 can always be kept as a standard component throughout. In so doing, the adapter section 2 accommodates the variety of different installation circumstances or various installation spaces in modern motor vehicles. The adapter section 2 can be detached from the base section 1, and changed out for other adapter sections as desired. Therefore, when the radiator blind 10 is used in another vehicle, the base section 1 itself does not have to be changed, and all that need be done is to connect another adapter section with the base section 1.

Figure 2:
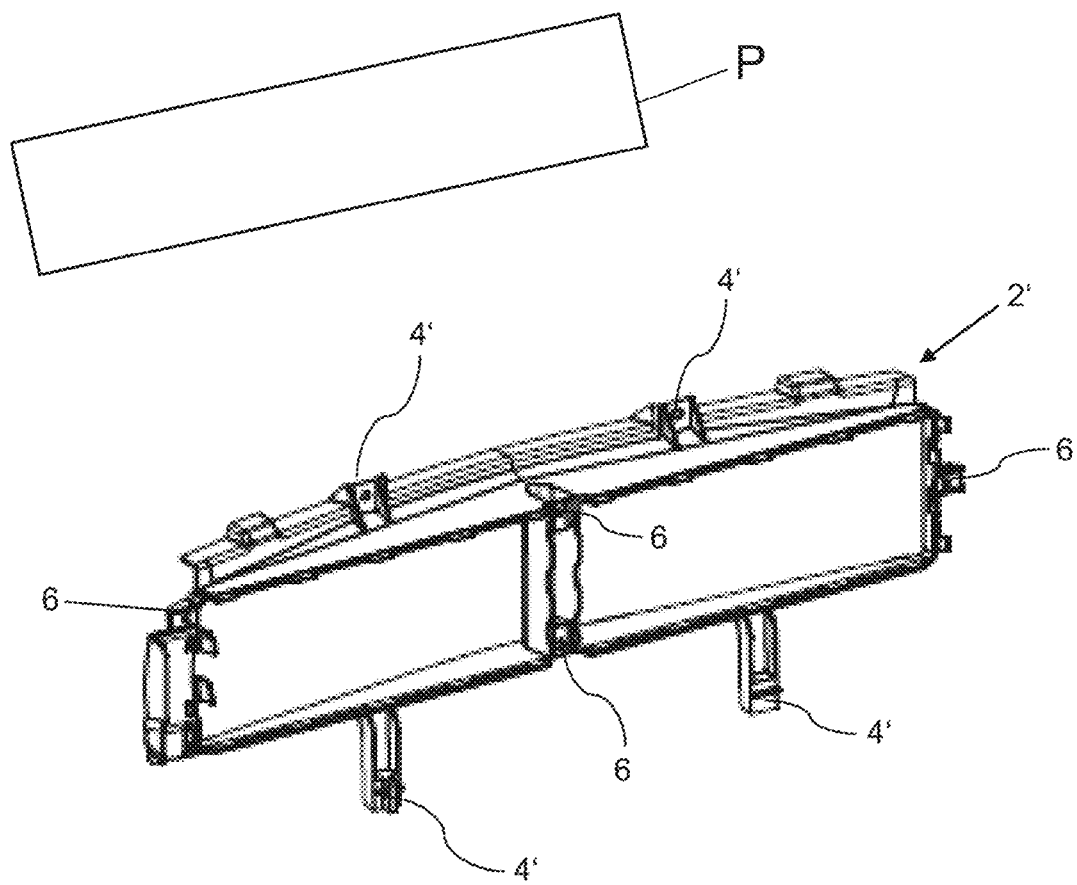
FIG. 2 is a possible embodiment of an adapter section that can be secured to a base section of the housing according to FIG. 1.

FIG. 2 shows a possible alternative adapter section 2', which is suitable for assembly with the base section 1 according to FIG. 1. The adapter section 2' is provided for installation circumstances different than the adapter section 2 according to FIG. 1. For example, the adapter section has terminal sections 4' situated at another location for this purpose.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A housing for a radiator blind of a motor vehicle, comprising:
   a base section that is configured to accommodate the radiator blind;
   a prescribed port; and
   an adapter section that is secured to the prescribed port, the adapter section including:
   a first mounting device for a cable;
   a second mounting device for at least one sensor; and
   a third mounting device for another part.

2. The housing according to claim 1, wherein the adapter section is detachably connected with the base section.

3. The housing according to claim 1, wherein the adapter section is replaceable.

4. The housing according to claim 1, wherein the base section is a standardized component.

5. The housing according to claim 1, wherein the adapter section is at least partially pressed against the base section.

6. The housing according to claim 1, wherein the adapter section is a frame that at least partially incorporates the base section.

7. The housing according to claim 1, wherein the adapter section is joined to the base section with a screw.

8. The housing according to claim 1, wherein at least one clipping element is arranged on the adapter section and holds the base section in an aligned position relative to the adapter section.

9. The housing according to claim 1, wherein the adapter section comprises at least one terminal section on which the adapter section is configured to secure to the prescribed port.

10. The housing according to claim 1, wherein the adapter section and the base section are pre-mountable.

11. The housing according to claim 1, wherein the adapter section is a plastic part.

12. An adapter as a vehicle replacement, comprising
 a radiator blind; and
 a housing for the radiator blind, the housing comprising:
  a base section that is configured to accommodate the radiator blind;
  a prescribed port; and
  an adapter section that is secured to the prescribed port.

13. The adapter according to claim 12, wherein the adapter section is detachably connected with the base section.

14. The adapter according to claim 12, wherein the adapter section is replaceable.

15. The adapter according to claim 12, wherein the base section is a standardized component.

16. The adapter according to claim 12, wherein the adapter section is at least partially pressed against the base section.

17. The adapter according to claim 12, wherein the adapter section is a frame that at least partially incorporates the base section.

18. The adapter according to claim 12, wherein the adapter section is joined to the base section with a screw.

19. The adapter according to claim 12, wherein at least one clipping element is arranged on the adapter section and holds the base section in an aligned position relative to the adapter section.

* * * * *